Jan. 15, 1957    J. E. HAWKINS    2,778,013
RADIO SURVEYING APPARATUS
Filed April 10, 1953
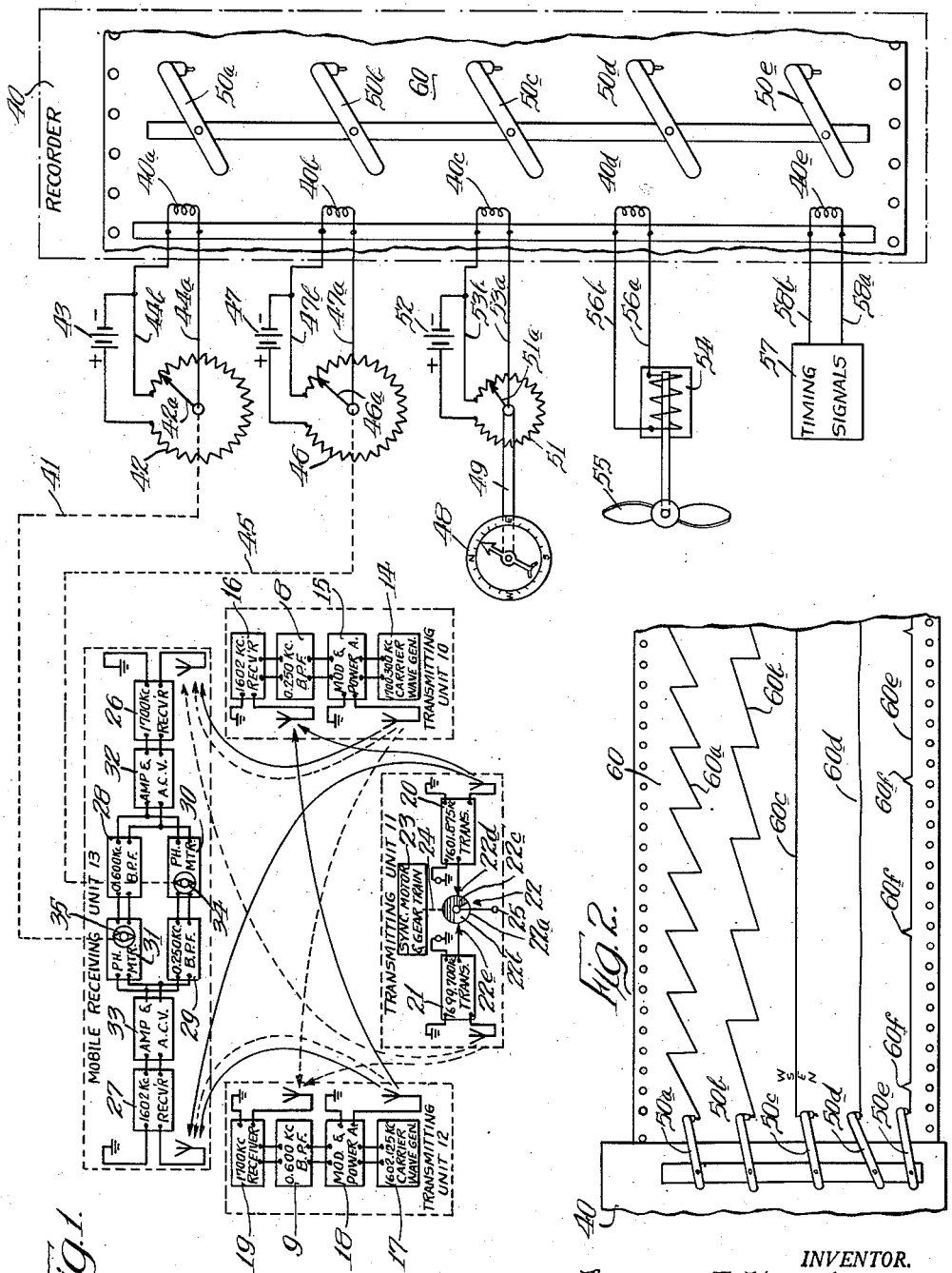
INVENTOR.
James E. Hawkins
BY
Mason, Kolehmainen, Rathburn & Wyss
Attys:

2,778,013
RADIO SURVEYING APPARATUS

James E. Hawkins, Broken Arrow, Okla., assignor to Seismograph Service Corporation, Tulsa, Okla., a corporation of Oklahoma Application April 10, 1953, Serial No. 348,087

5 Claims. (Cl. 343—105)

This invention relates to apparatus for recording data obtained from radio surveying systems and more particularly to improved apparatus for recording the information derived from radio position finding systems of the hyperbolic continuous wave type which employ phase comparison indication means positioned on a mobile craft in order to provide indications of the position of the craft with respect to at least three fixed signal transmitting stations and for simultaneously recording the movement of the craft.

The recording system of the present invention is adapted for use with systems presently employed in conducting accurate seismic surveys in which it is desirable to maintain a continuous record of the position of the exploration equipment. The recording system is particularly adaptable for use with radio position determining apparatus of the general type described in the Honore Patent 2,148,617 in which carrier waves from pairs of transmitter stations are heterodyned at a fixed link transmitting point, and the difference frequency components of the heterodyned waves are modulated as reference signals upon the carrier output of the link transmitting point for radiation to a receiving point. The signals emitted from pairs of spaced transmitting stations produce standing waves in space from which a mobile receiver positioned at some distance from each pair of transmitters receives the waves in a phase relationship which is dependent upon the position of the receiver with respect to each of the pair of transmitting stations. The standing waves produced by each pair of transmitters are characterized by equiphase lines which are hyperbolic in contour with the transmitting units as foci.

In determining the position of a receiving point within the range of the transmitting stations the phase relationship of signals reaching the receiver from one pair of transmitting units is indicative of one hyperbolic phase line along which the receiver is located. Since the point of location of the receiving unit is not established by the reception from one pair of transmitting units, it becomes necessary to employ at least three spaced transmitters as disclosed in the Patent No. 2,513,317 to James E. Hawkins and Robert S. Finn, assigned to the same assignee as the present invention. The three spaced transmitters function in pairs to provide a grid-like pattern of intersecting isophase hyperbolic lines in order to enable absolute determination of the position of the receiver point by means of phase comparison of signals received from each pair of transmitters. The position of the mobile receiver within one block in the grid formed by these hyperbolic isophase lines is indicated by the phase relationship between the received waves. More specifically, the intersection of identified lanes from each pair of transmitter units forms a grid and the phase comparison of signals within one lane of the grid thus establishes a position determination on a hyperbolic coordinate system. The hyperbolic coordinate system may be prepared as an overlay chart on a geographical map.

The measurements of the received waves from the two pairs of spaced transmitters identifies the position of the mobile receiver relative to two intersecting hyperbolic lines, but does not provide an indication of the exact position of the receiver since the equiphase lines between which the readings are taken are not identified by the phase measurements. Since there are several isophase lines for each pair of transmitting units, the phase comparisons are not completely determinative of position unless the nearest associated isophase lines or the lanes between these lines can be identified. A phase change of 360°, which occurs as the mobile receiver is moved one-half wave length of the transmitter frequency along a straight line joining the transmitters, is referred to as a lane and if these lanes can be identified, the phase comparison of received signals to establish the intersecting phase lines between lanes will accurately indicate the position of the receiver unit.

One means for identifying the lanes or grid lines has been to permit each of the mobile receivers to enter the radiation pattern of the transmitters at a known geographic point which is appropriately marked. When the first known point has been established, a phase change of 360° on the phase comparison means indicates the passage of the mobile unit through one lane. An integrating counter mechanism is set to add or subtract a digit from the phase indicator whenever a phase change of 360° occurs so that the lanes are continuously identified by the counter and the phase comparison means indicates the precise position of the receiver within the lane.

Heretofore, a great deal of difficulty has been encountered with lost lanes, that is, with lanes through which the mobile unit has passed without actuating the counter mechanism. Such occurrences might be caused by failure of the counting, receiving or transmitting equipment for a short period of time or, as is more common, by encountering a weak signal area as the receiver is moved from one lane to another. The presence of a weak signal area, which might be caused by local conditions adversely affecting radio wave propagation, renders the receiver insensitive to phase changes and, hence, the mobile unit may pass through a lane at a time when the counter mechanism is not actuated. As soon as signal strength returns to normal, the phase comparison means resumes its accurate indication of the hyperbolic intersection point; however, the counter mechanism has, in the meantime, failed to record the lane change and the position of the receiver unit is incorrectly indicated. Another source of error with regard to lane identification may be the presence of sky waves or other undesired signals which induce the phase comparison means to actuate the counter mechanism to indicate a lane change when actually no change has occurred.

It is an object of the present invention, therefore, to provide improved apparatus for identifying lost lanes in a hyperbolic continuous wave radio position determining system.

Another object is to provide an apparatus for recording data to aid in the subsequent identification of lost lanes in such a position determining system.

Another object is to provide a means for recording the movement of a mobile receiving unit in a system of the character herein described.

A further object of the invention is to provide improved apparatus for indicating the movement of a mobile receiver unit simultaneously with indication of the phase position of the unit in a system of the character described.

A still further object is to provide a permanent record of the phase position and the speed and direction of movement of a mobile receiver in a radio position determining system and simultaneously to record time intervals.

In accordance with the present invention, the foregoing and other objects of the invention are realized by providing a permanent and continuous record of the movement of the mobile receiving unit simultaneously with a recording of the phase comparison indications. The recording means provides a permanent record of the speed and direction of the mobile receiver and also provides a time recorder for marking time intervals on the record in order to correlate the information. In this manner, a single record chart is provided showing the phase position, the speed and direction of the receiver and the time of recording.

If a discrepancy appears in the lane indicator, this may be corrected by reference to the speed and direction chart of the mobile unit which may be plotted to provide a rough indication of the position at any instant. The phase position record provides an accurate indicator to be used in conjunction with the speed and direction plot. Therefore, the invention eliminates the problem of lost lanes by providing a readily available permanent record for checking the accuracy of the lane indicators.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 diagrammatically illustrates a recording system for radio position determining apparatus characterized by the features of the present invention; and Fig. 2 shows a typical permanent record chart produced by the recording apparatus of Fig. 1.

Referring now to the drawings and more particularly to Fig. 1 thereof, the present invention is there illustrated in its embodiment in a system for providing position information at a mobile receiving unit 13 which may be transported upon a vehicle or vessel operating within the transmitting radius of a plurality of spaced transmitting units 10, 11 and 12. The vehicle or vessel carrying the receiving unit 10 also carries seismic equipment and, for that reason, the seismic survey being conducted must include a continuous log of information as to the geographic position of the vessel or vehicle carrying the equipment.

The transmitting units are preferably spaced approximately equal distances apart so that the radiations from the transmitters 10 and 11 produce a hyperbolic interference pattern in which the transmitters are positioned at the foci of the hyperbolas and a constant phase difference exists at any point along one of the hyperbolic lines. It is apparent that a receiver which moves so as to be always equidistant from the transmitters 11 and 12 will receive signals from each of the transmitters, which are always in phase and, it is further evident, that movement of the receiver a slight distance away from the equidistant position between the two transmitters causes signals to be received which are out of phase. When the receiver is moved toward one of the transmitters for a distance of one half wave length along a line interconnecting the transmitters, the signals received are again in phase and this in phase relationship is maintained when the receiver is moved along a hyperbolic line having the two transmitters as foci. Thus a family of hyperbolic isophase lines are produced by the transmitters 10 and 11 which are spaced one-half wave length apart on a straight line interconnecting the transmitter stations. The radiations from transmitters 11 and 12 likewise produce a hyperbolic interference pattern similar to the pattern produced by the transmitters 10 and 11 but intersecting the hyperbolic lines of the latter pattern at an angle dependent on the positions of the transmitters so that a grid-like pattern of intersecting hyperbolic isophase lines is simulated. The area to be surveyed is thus covered by a radiation pattern from the two pairs of transmitters in which the intersecting equiphase lines from each of the pairs establish a hyperbolic grid in which the hyperbolic coordinate lines are positioned apart a distance corresponding to 360° of phase change.

The transmitters for establishing the hyperbolic equiphase grid may be of conventional design such as those described in Patent No. 2,513,317 mentioned previously and Patent No. 2,587,467 to James E. Hawkins and Robert W. Baltosser and the invention herein described is not limited to the specific units shown diagrammatically in Fig. 1. The units shown in Fig. 1 are of the type described in Patent No. 2,587,467 in which the transmitter embodied in the unit 10 comprises a carrier wave generator or oscillator 14 and a modulator and power amplifier unit 15. Similarly, the transmitter embodied in the transmitting unit 12 comprises a carrier wave generator or oscillator 17 and a modulator and power amplifier unit 18. The transmitting unit 11 comprises two transmitters 20 and 21 for respectively radiating position indicating carrier waves at two different carrier frequencies, together with switching means 22 for alternately rendering these two transmitters operative. In order to illustrate the operative condition of the various transmitters and the receiving unit 13 arrow pointed lines have been shown in Fig. 1 of the drawing to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating. From a consideration of these lines it will be understood that the receivers 26 and 27, which will be described in more detail hereinafter, alternately function as reference signal detecting receivers and as heterodyning receivers for receiving the required heterodyne or difference frequency signals. In the arrangement illustrated, keying of the two transmitters 20 and 21 for alternate operation is accomplished by alternately feeding anode current to the electron discharge tubes of the respective transmitters from the positive terminal 25 of an anode current source, not shown in the drawings, through a commutating ring 22a which is shaft connected by means of a shaft 24 to be driven at a constant speed by a synchronous motor and gear train unit 23. More specifically, the positive terminal 25 of the anode current source is connected to the conductive segment 22b of the commutating ring 22a, which segment spans slightly less than half the circumference of the ring. The remainder of the ring is comprised of an insulating segment 22c. At diametrically opposed points on the circumference of the ring, brushes 22d and 22e are provided which engage the ring periphery and are respectively connected to the positive bus conductors of the two transmitters 20 and 21 whereby anode current is alternately delivered to the transmitters. Since the conductive segment 22b represents less than half the peripheral surface of the ring, it will be understood that a short off-signal period is provided between successive periods during which the transmitters 20 and 21 are alternately operative, thus preventing simultaneous radiation of waves by both of the transmitters. The periodicity with which the two transmitters 20 and 21 are alternately operated is dependent upon the speed of rotation of the commutating ring. Preferably, this ring is driven at a speed of one revolution per second such that the transmitters 20 and 21 are each rendered operative at half-second intervals.

As indicated above, the carrier frequencies on which the four transmitters of the three transmitting units 10, 11 and 12 operate are all different. Preferably, however, these carrier waves are so paired that the frequencies of each pair are well within a single channel allocation of 10 kilocycles as specified by the Federal Communications Commission of the United States Government. To this end the output frequency of the transmitter 20 and the output frequency of the transmitter 17 in the unit 12 forming the first transmitter pair, may be 1601.875 and 1602.125 kilocycles, respectively, such that the difference frequency therebetween is 0.250 kilocycle while the output frequencies of the transmitter 21 and the transmitter of the unit 10 forming the second transmitter pair may be 1699.700 and 1700.300 kilocycles, respectively, such that the difference frequency therebetween is 0.600 kilocycle. It will be noted that the channels in which the two pairs of carrier frequencies fall are separated in the frequency spectrum by approximately 100 kilocycles, thus facilitating selective reception of these carrier pairs in the manner more fully explained hereinafter. The power of the four transmitters is such that the entire area in which position information may be desired aboard the vehicle or vessel carrying the mobile receiving unit 13 is blanketed with waves radiated from each of the four transmitters.

The transmitting units 10 and 12 are respectively provided with means for alternately modulating the waves radiated by the transmitters of the units 10 and 12 with reference signals representative of the difference frequencies between the carrier wave pairs. These reference signals may be received at any receiving point, such for example as the mobile receiving unit 13 located within the radius of transmission of the four transmitters. The equipment for this purpose as provided at the transmitting unit 10 comprises a fixed tuned amplitude modulation receiver 16, center tuned to a frequency of 1602 kilocycles and sharply selective to the 1601.875 and 1602.125 kilocycles carrier waves respectively radiated by the transmitter 20 and the transmitter of the unit 12. The selectivity of this receiver is obviously such that the carrier waves radiated by the transmitter 21 and the transmitter of the unit 10 are rejected in the radio frequency section thereof. The beat frequency of 0.250 kilocycle between the two carrier waves accepted by the radio frequency section of the receiver 16 is reproduced in the audio frequency section of this receiver and delivered to the modulator 15, for amplitude modulation upon the carrier wave output of the transmitter embodied in the unit 10, through a narrow band pass filter 8, which is center tuned to a frequency of 0.250 kilocycle. Similarly, the transmitting unit 12 is equipped with a fixed tuned amplitude modulation receiver 19 which is tuned to a carrier frequency of 1700 kilocycles and is shaply selective to the 1699.700 and 1700.300 kilocycles carrier waves respectively radiated by the transmitter 21 and the transmitter of the unit 10. Here again the selectivity of the receiver 19 is such that the carrier waves radiated by the transmitter 20 and the transmitter of the unit 12 are rejected in the radio frequency section of the receiver 19. The beat frequency of 0.600 kilocycle between the two carrier waves accepted by the radio frequency section of the receiver 19 is reproduced in the audio frequency section of the receiver and modulated upon the carrier wave output of the transmitter embodied in the transmitting unit 12 through a narrow band pass filter 9 which is center tuned to a frequency of 0.600 kilocycle.

Referring now more particularly to the equipment making up the mobile receiving unit 13 and the phase comparison and position computing apparatus associated therewith, it will be noted that this equipment comprises a pair of fixed tuned amplitude modulation receivers 26 and 27, the output circuits of which are respectively connected through suitable amplifier and automatic gain or volume control stages 32 and 33 to a pair of phase comparison devices or phase meters 30 and 31 and a pair of narrow band pass filters 28 and 29 center tuned to frequencies of 0.600 and 0.250 kilocycle. More specifically, the receiver 26 is fixedly tuned to a carrier frequency of 1700 kilocycles and is designed to accept the carrier wave radiated by the transmitter 21 and the carrier wave radiated by the transmitter of the transmitting unit 10 both when modulated and unmodulated. Similarly, the receiver 27 is fixedly tuned to a carrier frequency of 1602 kilocycles and is designed to accept the carrier wave radiated by the transmitter 20 and the carrier wave radiated by the transmitter of the unit 12 both when modulated and unmodulated.

Preferably, the phase meters 30 and 31 constitute null type motor-driven phase discriminating and indicating apparatus of the type described and claimed in the issued Patent No. 2,551,211 to James E. Hawkins and Beverly W. Koeppel. As there described, the rotatable members carry a pointer which indexes with a central scale to indicate the phase relationship between the two impressed voltages. In accordance with the present invention, however, the rotatable members 34 and 35 are employed as hereafter described to drive the record producing members of a recording mechanism 40 so as to continuously indicate on a recording medium 60 the phase position of the mobile receiving unit 13.

Before describing in detail the construction and operation of the recording mechanism and the record producing means driven by the rotatable members 34 and 35 of the phase meters 30 and 31, the operation of the transmitting and receiving apparatus of the positioning determining system will be more fully explained.

It will be understood that when the motor and gear train unit 23 is operating to drive the commutating ring 22a, anode current is alternately delivered to the electron discharge tubes of the transmitters 20 and 21 such that these transmitters are alternately rendered operative to radiate carrier waves at frequencies of 1601.875 and 1699.700 kilocycles, respectively. The transmitters of the units 10 and 12, on the other hand, operate continuously so that during each interval when the transmitter 20 is in operation, the carrier waves of 1601.875 and 1602.125 kilocycles, respectively radiated by the transmitter 20 and the transmitter of the unit 12 are picked up and heterodyned in the radio frequency sections of the receivers 16 and 27. In the receiver 16, the difference frequency signal of 0.250 kilocycle is reproduced in the audio section of the receiver, passed by the filter 8 and modulated upon the carrier wave output of the transmitter in the unit 10 for radiation as a reference signal. This modulated carrier wave is received by the receiver 26 of the mobile receiving unit 13 and the 0.250 kilocycle modulation component is reproduced at the output terminals of this receiver. During the period indicated, the transmitter 21 is not in operation and hence no heterodyned or beat frequency signal is developed by the receiver 26. The 0.250 kilocycle reference signal as thus reproduced by the receiver 26 amplified to the proper level in the amplifier and AVC stage 32 and applied to the right set of terminals of the phase meter 30 and also to the input terminals of the 0.600 kilocycle band pass filter 28. This filter rejects the applied signal and thus prevents the same from being applied to the right set of input terimnals of the phase meter 31.

The 0.250 kilocycle beat frequency or heterodyne signal resulting from heterodyning of the carriers radiated by the transmitter 20 and the transmitter of the unit 12 in the radio frequency section of the receiver 27 is reproduced across the output terminals of this receiver and after amplification to the proper level in the amplifier and AVC stage 33, is applied to the left set of input terminals of the phase meter 31 and the input terminals of the 0.250 kilocycle band pass filter 29. Since the filter 28 prevents a signal from being applied to the right set of input terminals of the phase meter 31, this phase meter does not respond to the signal voltage applied to its left set of input terminals by the receiver 27. The filter 29, however, passes the 0.250 kilocycle signal developed across the output terminals of the receiver 27 and applies the same to the left set of terminals of the phase meter 30. Thus two signal voltages of identical frequency are applied to the two sets of input terminals of the phase meter 30, with the result that this phase meter functions to rotate its indicator element 34 to a position which is accurately representative of the position of the receiving unit 13 between two isophase lines of the standing waves.

produced in space as a result of the carrier wave radiation by the transmitter 20 of the unit 11 and the transmitter of the unit 12.

At the end of the described transmitting interval, the commutating ring 22a functions to interrupt the circuit for delivering anode current to the tubes of the transmitter 20 with the result that carrier wave radiation from this transmitter is terminated. When radiation of this wave stops, the carrier heterodyning action of the two receivers 16 and 27 is likewise terminated to interrupt the reference signal radiation by the transmitter of the unit 10 and to interrupt the heterodyne or difference frequency signal being developed across the output terminals of the receiver 27. Thus the phase meter 30 is rendered ineffective further to change the setting of rotatable member 34.

A short time interval after operation of the transmitter 20 is stopped, the commutating ring 22a functions to deliver anode current to the tubes of the transmitter 21, thereby initiating operation of this transmitter. With the transmitter 21 in operation a 1699.700 kilocycle position indicating carrier wave is radiated which is accepted by the receivers 19 and 26. More specifically, the receiver 19 functions to heterodyne the carrier wave radiated by the transmitter 21 with the carrier wave radiated by the transmitter of the unit 10 and to reproduce the heterodyne or difference frequency signal of 0.600 kilocycle in the audio frequency section thereof. This difference frequency or reference signal is passed by the filter 9, modulated upon the output carrier wave of the generator 17 in the modulator and power amplifier unit 18 and radiated as a modulation component upon the carrier wave transmitted by the transmitter of the unit 12 to the receiver 27. The receiver 27 accepts the modulated carrier wave and reproduces the modulation component thereof in the manner heretofore described. The reference signal thus developed across the output terminals of the receiver 27 is amplified to the proper level in the amplifier and AVC stage 33 and applied across the left set of terminals of the phase meter 31 and to the input terminals of the band pass filter 29. This filter functions to reject the applied reference signal voltage and thus prevents the same from being impressed upon the left set of terminals of the phase meter 30. It will be understood that the receiver 27 is incapable of accepting the carrier wave radiated by the transmitter of the unit 10. Hence, this receiver is prevented from heterodying the carrier wave radiated by the transmitter of the unit 10 with the carrier wave radiated by the transmitter of the unit 12.

The 1699.700 and 1700.300 kilocycle waves respectively radiated by the transmitter 21 and the transmitter of the unit 10 are both accepted by the receiver 26 and heterodyned in the radio frequency section thereof to produce a heterodyne or difference frequency signal which is produced across the output terminals of the receiver and after amplification to the proper level in amplifier and AVC stage 32, is applied to the right set of input terminals of the phase meter 30 and the input terminals of the filter 28 in parallel. Since the filter 29 prevents the signal from being applied to the left set of input terminals of the phase meter 30, this phase meter does not respond to the signal voltage applied to its right set of terminals by the receiver 26. The 0.600 kilocycle reference signal applied to the input terminals of the filter 28 is passed by this filter and applied to the right set of input terminals of the phase meter 31. Thus, reference and heterodyne or difference frequency signals of identical frequencies are respectively applied to the two sets of input terminals of the phase meter 31 which functions to measure the phase relationship between the two applied signal voltages and rotate its indicator element 35 to a position accurately representative of the position of the mobile receiving unit 13 between two isophase lines of the standing waves produced in space by the radiation of position indicating carrier waves from the transmitter 21 of the unit 11 and the transmitter at the unit 10.

At the end of the described transmitting interval the commutating ring 22a functions to interrupt anode current flow to the tubes of the transmitter 21 and thus arrest operation of this transmitter. When carrier wave radiation by the transmitter 21 is thus terminated, the wave heterodyning action effected in the receivers 19 and 26 is instantly stopped to terminate the radiation of the 0.600 kilocycle reference signal by the transmitter of the unit 12 and to terminate reproduction of the difference or heterodyne signal at the output terminals of the receiver 26. Thus, the application of signal voltages to the two sets of input terminals of the phase meter 31 is interrupted with the resultant that no further change in the setting of the indicating element 35 can be produced. A short time interval after operation of the transmitter 21 is arrested, the commutating ring 22a functions to recomplete the circuit for delivering anode current to the tubes of the transmitter 20 and thus reinitiate operation of this meter with the results described above.

From the foregoing explanation it will be understood that the transmitters 20 and 21 in their alternate operation to radiate position indicating carrier waves cooperate with the receivers 16 and 19 of the transmitting units 10 and 12 alternately to render the transmitters of these units operative to radiate position indicating signals and reference signals. More particularly, the positioning indicating carrier waves alternately radiated by the transmitters 20 and 21 alternately cause the position indicating carrier waves respectively radiated by the transmitters of the units 10 and 12 to be modulated with reference signals during periods when these transmitters are respectively inactive as position indicating signal radiators. Specifically, the receiver 26 functions as a heterodyne receiver in respect to the positioning indicating carrier waves radiated by the transmitter 21 and the transmitter of the unit 10, and functions as a reference signal reproducing receiver in receiving the reference signal modulated carrier waves radiated by the transmitter of the unit 10. When receiver 27 on the other hand, functions as a heterodyne receiver in respect to the positioning indicating carrier waves radiated by the transmitter 20 and the transmitter of the unit 12 and as a reference signal detecting receiver in receiving the reference signal modulated carrier wave radiated by the transmitter of the unit 12.

As will be apparent from the above explanation, rotary movements of the rotatable members 34 and 35 of the phase meters 30 and 31, respectively, indicate changing position of the mobile receiving unit 13 relative to two sets of isophase lines having focal points at the positions 12, 11 and 10, the position 11 being common to the two sets. These rotatable members 34 and 35 are arranged to operate the movable elements 50b and 50a, respectively, of a recorder 40 in order to produce a continuous permanent record of the indications on the phase meters 30 and 31.

The recorder 40 may be of the movable stylus type, as shown in Fig. 1, in which a plurality of marking pens designated 50a, 50b, 50c, 50d and 50e, are used to record the information supplied to the recorder. The recorder, as shown in Fig. 1 in diagrammatic form is of the type in which signals are fed to the actuation or galvanometer coils 40a to 40e thereof in order to move the plurality of styli 50a through 50e transversely of a recording medium 60 passing beneath the styli, thereby to transcribe permanent and continuous records on the medium. Specifically, the rotor element of each meter is mechanically connected to actuate the movable contact of a potentiometer incorporated in the energizing circuit for one of the galvanometer coils of the recorder 40. Thus the movable element 35 of the phase meter 31 is directly connected through a mechanical coupling indicated by the dotted line 41 in Fig. 1 to a movable arm 42a of a potentiometer 42 which is encircuited within the energizing circuit for a galvanometer coil 40a of the recorder 40. A source of potential 43 applies a voltage across the terminals of the potentiometer so that the movable arm 42a supplies a voltage through conductors 44a and 44b to the galvanometer coil 40a which is constantly indicative of the position of the movable element 35. The galvanometer coil 40a controls the movement of the movable marking member 50a which continuously records the movement of the movable element 35 of the phase meter 31 so that a constant, permanent indication of one phase position of the mobile receiving unit 13 is provided. Similarly, the movable element 34 of the phase meter 30 is directly connected through a mechanical coupling indicated by the dotted line 45 in Fig. 1 to the movable arm 46a of a potentiometer 46 which is encircuited in the energizing circuit for galvanometer coil 40b of the recorder 40. A source of potential 47 applies a voltage across the terminals of the potentiometer so that the movable arm 46a supplies a signal through the output conductors 47a and 47b to the galvanometer coil 40b which is constantly indicative of the position of the movable element 34. In this manner a movable marking means 50b which is controlled by the galvanometer coil 40b produces a continuous permanent record of the phase position of the mobile receiving unit as indicated by the phase meter 30.

In accordance with the present invention, facilities are provided to permit continuous and positive lane identification at all times during the survey by providing the recorder 40, which records the phase position of the mobile receiver 13 in the manner heretofore described, with additional recording means for making a record of the speed and direction of movement of the mobile receiver. Provision is also made for recording time intervals on the recording medium simultaneously with the phase position, speed and direction indications, in order to properly correlate all of the recorded information. A continuous record of phase position and movement of the receiver enables a reconstruction of the survey whenever it becomes apparent that a lane has been lost for one of the reasons mentioned above. Thus, if the receiver or transmitter equipment is inoperative for a short period of time, information is available for plotting the approximate position of the mobile receiver from the speed and direction record and the restoration of the equipment to normal operation immediately provides phase position information for accurately establishing the position. The time record makes it possible to determine the period of inoperativeness of the apparatus which is of assistance in plotting the approximate receiver position. One of the principal advantages of recording the speed and direction of movement of the receiver is to enable a reproduction of the survey at a shore station after the information has been gathered at the mobile position.

In order to provide a continuous indication of the speed of movement of the mobile receiver, the signal output of an electric tachometer 55 which measures the speed of rotation of the driving means for the vessel carrying the receiving equipment is applied to the galvanometer coil 40d of the recorder through conductors 56a and 56b. The electric tachometer shown in Fig. 1 is directly coupled to the propeller shaft of the vessel; however, any type tachometer may be employed to provide an indication of speed and if desired, a standard mechanically operating tachometer may be employed in which the indicating element thereof is directly coupled to the movable arm of a rotating potentiometer in a manner similar to the units previously described. In some installations it may be desirable to use a separate water-drag propeller having a tachometer attached thereto for providing signals indicative of speed, but irrespective of the type of tachometer employed, signals are produced which move the stylus 50d transversely of the recording medium to a position dependent on the speed of movement of the mobile unit.

For the purpose of recording the direction of movement of the mobile receiver 13, rotatable potentiometer 51 and power supply 52 are associated with a remote indicating compass 48 of any suitable type conventional in the art, so that the movable arm of the potentiometer is directly coupled to the indicating needle of the compass through a mechanical linkage designated by the numeral 49. The output appearing across conductors 53a and 53b is therefore a signal of an amplitude which is dependent upon the position of the compass needle, and this signal is applied to the galvanometer coil 40c of the recorder in order to control the movement of the stylus 50c. This latter stylus, therefore, transcribes a pattern on the recording medium which is indicative of the position of the remote compass 48 which, in turn, measures the direction of movement of the mobile receiver unit 13.

A suitable source of timing signals 57 is used to apply signals to galvanometer coil 40e of the recorder to move the stylus 50e thereby applying a timing marker to the record medium at periodic intervals so that the record chart is thereby provided with a time base enabling interpretation of the recorded information. If desired, the time markers may be applied by manual operation of the stylus 50e by an operator who notes the time and actuates the stylus at predetermined intervals. The record medium 60 may be moved beneath the styli by a conventional constant speed driving mechanism within the recorder 40 which is similar in nature to a clock driving mechanism or, if desired, the chart may be driven by an external driving source. Regardless of which type driving mechanism is employed, the time marks applied at definite timed intervals correlate the chart speed with the time so that proper interpretation of the recorded information is facilitated.

Fig. 2 illustrates a typical permanent record which may be produced by the recorder 40 as the recording medium 60 passes beneath the marking members 50a through 50e. The marking members of the recorder are continuously operated to produce a series of spaced indications on this record strip which are indicative of the phase position of the movable receiver, the direction and speed of movement of the mobile unit, and of time intervals which are periodically recorded at definite predetermined instants. In this regard it will be understood that each of the recording elements 50a through 50e produces a separate and distinct trace on the record strip 60 and that the position of the trace transversely of the strip is indicative of variations in the energization of the galvanometer coil associated with each of the marking elements. Thus, as the galvanometer coil 40a is variably energized by movement of the receiver 13 with a consequent change in phase position with respect to transmitters 10 and 11, a trace 60a is produced on the record strip which accurately shows variations in the signal applied to the galvanometer coil. Since, at any fixed position of the mobile unit, the coil 40a is constantly energized by a constant amplitude signal developed across a portion of the potentiometer 42, the magnitude of which is dependent upon the setting of the rotor element 35 in the phase meter 31, a straight line trace will be produced on the recording medium 60 if the mobile unit remains at the fixed position. Also, the recording element 50b will transcribe a straight line on the recording medium 60 due to the constant setting of the potentiometer 46 if the mobile unit is undergoing no change in position. The record shown in Fig. 2, however, shows a typical trace which is produced as the mobile receiving unit is moved in a predetermined direction at a substantially constant speed to cross several of the equiphase lines established by the transmitting units 10, 11 and 12. As the mobile receiving unit is moved from one equiphase line of the transmitters 12 and 11 to the next succeeding equiphase line, the movable arm 42a of the potentiometer 42 makes one complete revolution so that a gradual increase in the voltage supplied to the galvanometer coil 40a results. The energization of the galvanometer coil 40a in this manner induces the marking element 50a to move transversely of the recording medium 60 and produce a straight line trace having a slope which is dependent upon the speed of movement of the recording medium beneath the recording element and on the speed of rotation of the movable arm 42a. As the arm 42a nears the completion of its revolution, an open circuit is encountered and no voltage is supplied to the galvanometer coil 40a; at this time, the movable element 50a is returned to its initial position under the influence of spring bias in a direct transverse movement across the recording medium. Thus, for each complete revolution of the movable arm 42a an approximately saw-tooth shaped line is produced on the recording medium and, if the mobile unit continues to move in the same direction and at the same speed, a series of similar saw-tooth lines will be produced as indicated by the trace 60a on the recording medium.

In similar manner, the movement of the mobile receiving unit from one equiphase line of the transmitters 10 and 11 to the next succeeding equiphase line causes the rotary element 34 of the phase meter 30 to make one complete 360° rotation thereby moving the movable arm 46a of the potentiometer 46 through a complete revolution. As the movable arm 46a is rotated, a varying current is supplied to the galvanometer coil 40b which causes the movable element 50b to move from an initial position transversely of the recording medium to trace a pattern in a manner similar to the production of the trace 60a by the movable element 50a as just described. As the movable arm 46a nears the completion of its revolution an open circuit is encountered on the potentiometer and no energizing current is supplied to the galvanometer coil 40b so that the recording element 50b is returned to its initial position and thus a substantially saw-tooth shaped trace is produced. As the mobile unit 13 continues to move at constant speed in the same direction, a series of saw-tooth lines is formed as indicated by the trace 60b on the recording medium. It will be noted that the saw-tooth wave produced by the recording element 50b is not necessarily of the same width as the saw tooth wave produced by the recording element 50a since the movable elements 34 and 35 of the phase meters 30 and 31 do not necessarily move at the same speed. Of course, the direction and speed of movement of the mobile unit may be such as to cause the rotary elements 34 and 35 to rotate at the same speed and in this event the saw-tooth waves 60a and 60b produced on the recording medium would be of equal width. The transverse distance between any point on the saw-tooth wave and the base line of the wave, which corresponds to the initial position of the movable elements 50a and 50b and to the open circuit positions of their control potentiometers is accurately indicative of the setting of the rotor elements 35 and 34, respectively.

The recorder element 50c which is responsive to the energization of the galvanometer coil 40c is moved transversely of the recording medium 60 by an amount which is dependent upon the position of the remote indicating compass. Let it be assumed, for instance, as shown in Fig. 1, that a true north indication on the compass induces the movable arm 51a of the potentiometer 51 to occupy a position which corresponds to an open circuit on the potentiometer at which position energization is supplied to galvanometer coil 40c. At this time, the recording element 50c occupies its extreme lower position on the recording medium 60 and a due north setting is indicated. As the mobile unit is turned from a due north heading to a due east heading, the indicating needle of the remote compass rotates through 90° and the movable arm 51a of the potentiometer correspondingly undergoes a 90° rotation. The movable recording element 50c responds to this change in energization of the galvanometer coil 40c and is moved transversely of the recording medium to indicate the change in heading. It is apparent that further change in the direction of movement of the mobile receiving unit from east to south causes further movement of the movable arm 51a and induces further transverse movement of the recording element 50c. The maximum transverse movement of the recording element 50c occurs when the remote indicating compass 48 approaches the due north heading at which time the movable arm 51a picks off a maximum voltage from the potentiometer 51. Hence, it is apparent that the recording element 50c produces a trace similar in appearance to the trace 60c shown in Fig. 2, which is constantly representative of the direction of movement of the mobile receiving unit. Since the trace shown in Fig. 2 was produced by a mobile receiving unit which was moving at approximately constant speed and in a nearly constant direction, the trace 60c approximates a straight line since the remote indicating compass during the recording period was indicating an approximately constant heading and consequently no variation in the energization of the galvanometer coil 40c resulted.

To provide a record trace which is constantly representative of the speed of movement of the mobile unit 13, the galvanometer coil 40d is energized by a signal which is directly proportional to the speed of movement of the mobile unit to thereby control the trace produced by the recording element 50d. When the mobile unit is stationary no energization is supplied to the galvanometer coil 40d from the tachometer 54 and the recording element 50d occupies its lower position with respect to the recording medium 60. Since the signal supplied to the galvanometer coil 40d is directly proportional to the speed of rotation of the driving means for the mobile unit, the recording element 50d is moved transversely of the recording medium by an amount which is also proportional to this speed. As mentioned previously, the record trace 60d shown in Fig. 2 was produced by a mobile unit moving at approximately constant speed, and therefore, this trace is substantially a straight line. However, it is to be understood that if the speed of movement of the mobile unit were increased, the trace 60d would be distorted upwardly to indicate this change in speed, and, conversely, if the speed were decreased, the trace would be distorted downwardly. In this manner, a permanent record is provided which is continuously indicative of the speed of movement of the mobile unit 13.

The trace 60e shows a plurality of time signals 60f which have been applied to the recording medium in order to correlate the recorded information on phase position, and the speed and direction of movement of the mobile unit, with time. By comparing these time signals with the other record traces, an accurate reproduction of the survey is possible.

From the above explanation it is apparent that the present invention affords a satisfactory solution to the problem of identifying lost lanes by continuously recording the movement and the phase position of the mobile receiver unit with respect to time so that a permanent record is available to aid in a subsequent detailed analysis of the survey.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In a radio position finding system of the hyperbolic continuous wave type employing phase comparison in pairs of signals radiated from at least three spaced transmitting points to provide a pair of indications from which the position of a mobile craft relative to the known positions of the transmitting points may be determined, the combination of receiving apparatus on said mobile craft and including phase measuring means for measuring the phase relationships between said signals, means controlled by said phase measuring means for recording said phase relationships on a record medium, and means for simultaneously recording the movement of the craft on the same record medium at a position correlated with the records of said phase relationships, thereby to facilitate accurate identification of the position of said mobile craft at all times.

2. In a radio position finding system of the hyperbolic continuous wave type employing phase comparison in pairs of signals radiated from at least three spaced transmitting points to provide a pair of indications from which the position of a mobile craft relative to the known positions of the transmitting points may be determined, the combination of receiving apparatus on said mobile craft and including phase measuring means for measuring the phase relationships between said signals, means controlled by said phase measuring means for recording said phase relationships on a record medium, means for simultaneously recording the direction of movement of the craft on the same record medium, and means for simultaneously recording the speed of movement of the craft at a position on the same record medium correlated with the record of the craft movement and with the records of said phase relationships, thereby to facilitate an accurate determination of the position of said mobile craft.

3. In a radio position finding system of the hyperbolic continuous wave type employing phase comparison in pairs of signals radiated from at least three spaced transmitting points to provide a pair of indications from which the position of a mobile craft relative to the known positions of the transmitting points may be determined, the combination of receiving apparatus on said mobile craft and including phase measuring means having a pair of indicator members rotatable to provide said indications, means for recording the positions to which said rotatable members are moved on a record medium, thereby to record said indications, and means for recording the movement of the craft position on the same record medium simultaneously with the recording of the positions of said indicator members, thereby to provide a plurality of records in correlated position on said record medium in order to facilitate the determination of the position of said mobile craft.

4. In a radio position finding system of the hyperbolic continuous wave type employing phase comparison in pairs of signals radiated from at least three spaced transmitting points to provide a pair of indications from which the position of a mobile craft relative to the known positions of the transmitting points may be determined, the combination of receiving apparatus on said mobile craft and including phase measuring means having a pair of indicator members rotatable to provide said indications, means for recording the movements of said indicator members on a record medium, thereby to make a continuous record of the indications, means for recording the speed of movement of the receiver position on the same record medium simultaneously with the recording of the movements of said indicators, means for recording the direction of movement of the receiver position on the same record medium simultaneously with the recording of speed, and means for continuously recording time intervals on the same record medium, all of said records being correlated in position on said record medium in order to facilitate the determination of the position of said mobile craft.

5. In a radio position finding system of the hyperbolic continuous wave type employing phase comparison in pairs of signals radiated from a plurality of spaced transmitting points to provide a pair of indications from which the position of a mobile craft relative to the known positions of the transmitting points may be determined, the combination of receiving apparatus on said mobile craft and including a first phase measuring means having an indicator member rotatable to provide one of said indications and a second phase measuring means having an indicator member rotatable to provide a second of said indications, a first phase recording means for continuously recording on a record medium the position of the rotatable member of the first phase measuring means, a second phase recording means for continuously recording on the same record medium the position of the rotatable member of said second phase measuring means, speed recording means for recording the speed of movement of the mobile craft on said record medium, and direction recording means for recording the direction of movement of the mobile craft on said record medium, all of the records being arranged in side by side relationship on said record medium in order to correlate the recorded information and facilitate the determination of the position of said mobile craft.

References Cited in the file of this patent
UNITED STATES PATENTS

| | | |
|---|---|---|
| 477,284 | Townsend | June 21, 1892 |
| 734,156 | Baxandall | July 21, 1903 |
| 1,706,066 | Karcher | Mar. 19, 1929 |
| 1,850,978 | Sperry | Mar. 22, 1932 |
| 1,942,262 | Shanklin | Jan. 2, 1934 |
| 2,198,113 | Holmes | Apr. 23, 1940 |
| 2,513,314 | Hawkins | July 4, 1950 |
| 2,587,467 | Hawkins et al. | Feb. 26, 1952 |
| 2,610,226 | Klaase et al. | Sept. 9, 1952 |